United States Patent [19]

Lee et al.

[11] 3,876,709
[45] Apr. 8, 1975

[54] NUCLEAR OXIDATIVE OF ALKYL-SUBSTITUTED PHENOLS IN PRESENCE OF LOWER ALKENOIC ACID SOLUTION OF POTASSIUM DICHROMATE AND MANGANESE ACETATE

[75] Inventors: Richard J. Lee, Downers Grove; Robert E. Karll, Batavia, both of Ill.

[73] Assignee: Standard Oil Company, Chicago, Ill.

[22] Filed: Oct. 26, 1972

[21] Appl. No.: 301,125

[52] U.S. Cl........ 260/619 R; 252/46.3; 252/51.5 R; 260/620; 260/624 R
[51] Int. Cl...................... C07c 39/12; C07c 37/00
[58] Field of Search.......................... 260/619 R, 620

[56] References Cited
UNITED STATES PATENTS

| | | | |
|---|---|---|---|
| 2,338,634 | 1/1944 | Fuchs........................... | 260/619 R X |
| 2,790,009 | 4/1957 | Gresen........................... | 260/619 R |
| 3,322,838 | 5/1967 | Carrick et al................... | 260/619 R |

*Primary Examiner*—Leon Zitver
*Assistant Examiner*—Norman Morgenstern
*Attorney, Agent, or Firm*—Fred R. Ahlers; Arthur G. Gilkes; William T. McClain

[57] ABSTRACT

Derivatives of nuclear coupled alkylphenols, that is nuclear carbon-to-carbon coupling, have higher activity as lubricating oil addition agents than the same derivatives of the parent alkylphenols. For example, sulfonamides or products of the Mannich Reaction derived from coupled p-alkylphenolsulfonyl chloride and an amine or coupled alkylphenol, amine and formaldehyde have higher activity than the same derivatives from the parent p-alkylphenol. Two, three, four, five, six and up to seven molecules of alkylphenol can be coupled through nuclear carbon-to-carbon coupling in the presence of a lower alkanoic acid (e.g., acetic acid) solution of potassium dichromate and manganese acetate.

9 Claims, No Drawings

NUCLEAR OXIDATIVE OF ALKYL-SUBSTITUTED PHENOLS IN PRESENCE OF LOWER ALKENOIC ACID SOLUTION OF POTASSIUM DICHROMATE AND MANGANESE ACETATE

BACKGROUND OF INVENTION

2-Hydroxy-4-alkylbenzenesulfonamides of polyamines such as an ethylene polyamines, wherein there are 1–10 divalent ethylene groups and 2–11 amino groups of which two are primary and 0–9 are secondary amine groups; the bis(aminoalkyl)piperazine, wherein the alkyl group has 1–10 carbon atoms; and the alpha, omega alkylene diamines, wherein the alkylene group has 3 to 12 carbon atoms, are useful addition agents for lubricating oils imparting detergency and oxidation inhibition thereto wherein the nuclear alkyl-substituent has a molecular weight of 300 to 3,000. Such sulfonamides are obtained by reacting those polyamines with hydroxy, alkylbenzenesulfonyl chloride.

Mannich Reaction products derived from alkylphenol, formaldehyde and an amine especially the foregoing polyamines also are useful addition agents for lubricating oils. Products of such Mannich Reaction using alkylphenols wherein the alkyl group has from 6 to about 25 carbon atoms (i.e., in alkyl group from dimethylbutyl to wax derived alkyl groups) are used as calcium phenate salts for their anti-oxidant properties. But Mannich Reaction products derived from alkylphenols whose alkyl-substituent has a molecular weight in the range of 300 to 3,000 and higher are useful per se in lubricating oils to impart detergency and dispersancy to such oils.

It has been discovered that the activity of such sulfonamides and products of the Mannich Reaction can be increased by using sulfonyl chloride of dimer nuclear coupled alkylphenol or the coupled phenol in place of the hydroxy, alkylbenzenesulfonyl chloride or alkylphenol reactants. The sulfonylchloride of dimer nuclear coupled alkylphenol is readily prepared by conventional chlorosulfonation using chlorosulfonic acid.

SUMMARY OF INVENTION

Two to seven molecules of alkyl-substituted phenol, wherein the positions ortho to hydroxyl-substituent are unsubstituted and not sterically blocked and the alkyl-substituent has 6 carbon atoms (85 MW) up to 214 carbon atoms (3000 MW) can be nuclearly carbon-to-carbon coupled at a temperature from ambient (75°–77°F.) up to 250°F. by reacting the alkylphenol with substantially glacial acetic acid (1–5 percent water) solution of chromic acid promoted with dissolved manganese. The coupling reaction is oxidative even though the coupling is carbon-to-carbon between rings and is exothermic. The exothermic reaction is conducted without removal of heat of reaction by slow addition of the alkyl-substituted phenol to stirred acetic acid solution of chromic acid and manganese promoter at ambient temperature (75°–77°F.) at a rate to obtain about a 5° to 30°F. temperature increase; i.e. the temperature at the end of alkylphenol addition is 80°–110°F. It is surprising that the alkyl-substituent is not oxidized and oxidation of the 85 to 3,000 MW alkyl side chain or a portion thereof apparently does not occur at a temperature up to about 250°F. or even at 250°F. for reaction periods of up to 4 hours.

The acetic acid solution of chromic acid and manganese promoter can be supplied by dissolving sodium or potassium dichromate and manganese acetate or carbonate tetrahydrate in glacial acetic acid using a small amount of water to complete dissolution of the manganese salt. The amount of manganese promoter used is in the range of 0.3 to 0.6 gram atom per mole of alkylphenol. The amount of chromic acid per mole of alkylphenol varies with the number of molecules thereof to be coupled. To couple 2 to 7 molecules of alkylphenol the amount of chromic acid is in the range of 1 to 3.5 moles per mole of alkylphenol.

To facilitate handling of the alkyl-substituted phenol and its contact with the acetic acid solution, it is desirable to use a hydrocarbon solution of the alkylphenol reactant of low viscosity at ambient temperature. The hydrocarbon solvent should be relatively inert and can be aliphatic hydrocarbons of substantially the same molecular weight as the alkyl-substituent of alkylphenol reactant, or light grades (SAE-5 to SAE-10) lubricating oils or mixtures thereof. Advantageously such solutions can be further diluted with benzene not only to provide a lower viscosity solution of alkylphenol reactant for addition to the acetic acid solution but also to provide for later removal of by-product water of reaction. Since the amount of by-product water is small and benzene can be recycled for that purpose, the amount of benzene used is not critical.

Increasing reaction temperature above the final temperature of combining the alkylphenol reactant and acetic acid solution of chromic acid and manganese promoter up to 200°F. increases the number of molecules of alkylphenol that are coupled. Coupling of two to three molecules proceeds at the final addition temperature of 80°–110°F. in 10 to 20 hours. Distillative removal of benzene-water azeotrope containing a small amount of acetic acid, acetic acid strength of 1–3%, does not appear to cause further molecular coupling as is the case when temperatures above such 1–3% acetic acid-benzene azeotrope reflux formation up to 200°F.

A solution of the coupled alkylphenol product is obtained by first distilling off the 1–3% acetic acid-benzene azeotrope with benzene recycle until no further azeotrope forms and removing substantially all of the benzene. Then solid inorganic salts present are separated by any means for effecting separation of solids from liquids such as filtration or centrifugation. Filtration removes the solid inorganic salts but not the chromic acid. Centrifugation also removes some of the chromic acid. Complete chromic acid removal is accomplished by adding a $C_5-C_{10}$ alkane hydrocarbon to the inorganic salt-free reaction mixture, settling the mixture to form two phases: a top organic phase and a bottom chromic acid phase. The alkane hydrocarbon sharpens separation of the phases. After separating the organic phase, it is washed with water and heated to remove the alkane which also completes drying of the product solution.

The coupled alkylphenol can be recovered as neat product by removal of the oil-like solvent by known means.

The alkylphenol reactant can be prepared by known catalytic reaction of phenol with an alkylene hydrocarbon. Catalysis provided by $BF_3$ phenate or $BF_3$-phenol complex favors the formation of p-alkylphenol which has two unsubstituted ortho positions with respect to the hydroxyl substituent. Single p-alkylphenol entities can be prepared from single alkylenes of low carbon (6–20) content but for higher carbon content the alkylenes are mixtures of two or more alkylenes resulting in mixtures of alkyl-substituted phenols characterized by their number average molecular weight ($\overline{M}_n$). The polyalkyl-substituted phenols prepared by catalytic alkylation of phenol with a polyalkylene (the alkylated phenols still have one alkyl-substituent) are such mixtures of alkylphenols. Cracked large petroleum fractions (petroleum waxes) and polymers of propene and butenes are representative of such polyalkylene hydrocarbon alkylating materials leading to mixtures of mono-polyalkyl-substituted phenols. Not all of the polyalkylene alkylating hydrocarbons react with phenol because their unsaturated carbons are blocked or sterically hindered. Such unreactive species can amount to 10–30 percent of the polyalkene and remain for the most part as diluent of the alkylphenol product. Such polyalkylene reactants have $\overline{M}_n$ of about 200 to about 3,000 and provide polyalkyl-substituted phenols of 300–3,100 $\overline{M}_n$ diluted with the respective unreactive 200 to 3000 $\overline{M}_n$ unreactive species. Such polyalkylphenol-containing products are rather viscous liquids as are the lower $\overline{M}_n$ alkylphenols and in general, be diluted to 40–45 weight percent alkylphenol content with a low viscosity lubricating oil such as SAE-5W to SAE-10 grade oil.

The nuclearly carbon-to-carbon coupled p-alkylphenols of this invention have the formula:

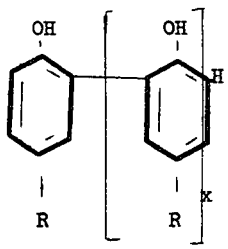

wherein $x$ is an integer from 1 to 6 and R is the alkyl-substituent of 85–3000 $\overline{M}_n$.

For some derivative uses the increase in size of alkyl-substituent on phenol does not increase activity function of the lubricating oil addition agent. For other derivatives the feasible increase in size of the alkyl-substituent has little effect on the activity function of the derivative in lubricating oil. For example, the calcium phenates of Mannich Reaction products from equal molecular portions of alkylphenol, ethylene diamine, and formaldehyde and 0.5 mole calcium hydroxide used as anti-corrosion addition agent in lubricating oil do not increase in activity as the alkyl-substituent of the alkylphenol reactant is increased beyond the range of 6–12 carbon atoms. Such lack of activity increase is probably caused by diminishing of calcium contribution by the higher molecular weight alkylphenol component. However, such calcium salts of the same type Mannich Reaction products derived from 1:1:1 mole ratio of 2–6 coupled $C_6$–$C_{12}$ alkylphenol, ethylene diamine and formaldehyde and using one mole calcium hydroxide for each two moles of OH groups does increase the anti-corrosion activity because the calcium contribution is much greater for the higher molecular weight contribution of the alkylphenol reactant.

In other derivatives such as the dispersant-detergent sulfonamides derived from alkylphenol sulfonyl chloride or Mannich Reaction products of alkyl-substituted phenols, wherein the alkyl-substituent in the sulfonamide or Mannich Reaction product has an average molecular weight above about 300, it is not commercially feasible to alkylate phenol with a polyalkylene having a molecular weight above an average molecular weight of above 3000, because, unless one resorts to use of polyalkylenes of the butyl rubber type, polyalkylenes of average molecular weight above 3000 are not commercially available. Also the molecular weight of such alkyl group of MW above 6000 is so great with respect to that of the hydroxyphenyl group as to mask its known beneficial properties contribution to the dispersant-detergent high molecular weight Mannich Reaction products. As a practical matter the beneficial properties contributed by the hydroxyphenyl group of alkylphenol to such Mannich Reaction products as well as the dispersancy-detergency effectiveness of such products and the sulfonamide derivatives of sulfonyl chlorides of alkylphenols are not, in general, increased by increase in size of the alkyl group beyond about 3000 MW. However, by nuclear carbon-to-carbon coupling of 300–3000 average molecular weight alkyl-substituted phenols to obtain dimer to hexamer products thereof, the much higher molecular weight dimer to hexamer of such alkyl-substituted phenol retain the desirable balance between alkyl-substituent size with respect to the hydroxyphenyl group apparently needed for those lubricating oil dispersant-detergent addition agents. Moreover, this effectiveness appears to be enhanced when used on the same weight basis of the sulfonamide or Mannich Reaction products having parent non-coupled alkyl-hydroxyphenyl groups even though they are present in lower molar concentrations in the oil. Furthermore, it has been discovered that they have in addition to dispersancy-detergency properties the surprising viscosity index improving property not obtainable from the sulfonamide or Mannich Reaction product from non-coupled alkylphenols. Such viscosity index improving property is surprising because viscosity index improvement has, in general, been obtainable only by the introduction of alkyl hydrocarbon groups of average molecular weight above about 10,000.

Alkylphenols having alkyl-substituents of 85 to 3000 average molecular weight are known to be obtainable by catalytic alkylation of phenol with the appropriate polyalkylene hydrocarbon, especially using the $BF_3$ phenolate catalysis. Such catalysis favors the formation of p-alkylphenols. Particularly useful for such alkylations are commercially available polypropylene or polybutenes having number average molecular ($\overline{M}_n$) weights in the range of 85 to 3000. Also suitable as the smaller-polyalkylene reactants, i.e., 85 to 450 molecular weight are petroleum fractions which are either single alkene hydrocarbons, isomeric mixtures of alkylene hydrocarbons having the same total carbon content or mixures of different alkene hydrocarbons differing by no more than two carbon atoms in size, for example a fraction containing $C_{16}$ to $C_{18}$ carbon atoms. Although number average molecular weight ($\overline{M}_n$) is generally used to characterize polymeric products such as polypropenes or polyisobutenes, said $\overline{M}_n$ will hereinafter be used for consistency of definition to characterize the alkylphenol to be coupled and its alkyl-substituent for the range of 85–3000 molecular weight.

The following examples of the present inventive nuclear carbon-to-carbon coupling of alkylphenols are given in detail to illustrate and demonstrate the practice of said inventive coupling method.

EXAMPLE 1

To a reaction vessel having a heating mantle, stirrer and reflux condenser there is added one liter of glacial acetic acid in which 59 grams (0.2 mole) of potassium dichromate, 20 grams (0.106 mole) of manganese acetate tetrahydrate and 0.05 liter of water were dissolved. The solution is stirred at ambient temperature (75°–77°F.) and pressure to the stirred acetic acid solution there is slowly added a solution of 318.5 grams (0.137 mole) p-polybutylphenol of 1600 $\overline{M}_n$ (polybutyl group of 1507 $\overline{M}_n$) dissolved in solvent comprising 381.5 grams hydrocarbon of light grade lubricating oil type and 0.3 liter of benzene. After said slow addition, the temperature of the stirred mixture increased 10°F. Stirring of said mixture without heating is continued for 5 to 6 hours and then the stirred mixture is heated to 180°F. at which temperature a mixture of benzene and water reflux forms. Reaction was continued at 180°F. for 4 hours. Thereafter 0.5 liter of a mixture of most of the benzene with some water and acetic acid is removed by distillation and the remainder of the reaction mixture is filtered to remove all inorganic salts. The filtrate on standing separated into two phases: a top liquid organic phase and a bottom chromic acid phase. Separation of the two phases is enhanced by slight dilution of the liquid organic phase with hexane. The hexane diluted liquid organic phase containing about 100 ppm Cr is recovered and washed twice with hot (—°F.) water which removes all the chromium. The washed liquid organic solution is stirred and heated to 300°F., nitrogen is injected into the stirred liquid to assist in the removal of all hexane, benzene, water and acetic acid. The residue is cooled to 210°F. at which temperature it found to have a viscosity of 2800 SSU. The residue is found to contain 46.5 weight percent of coupled p-polybutylphenol of 5000 $\overline{M}_n$.

EXAMPLE 3

The method of Example 1 is repeated except, after completion of addition of solution of p-polybutylphenol of 1769 $\overline{M}_n$, the stirred mixture is heated for 4 hours at a temperature of 192°F. and then most of the benzene is removed by distillation. The residue, after removal of salts, chromic acid, hexane, water and acetic acid, has 46.5 weight percent coupled p-polybutylphenol of 5031 $\overline{M}_n$.

EXAMPLE 4

The method of Example 1 is repeated except, after completion of addition of solution of p-polybutylphenol of 1769 $\overline{M}_n$, the solution is stirred for 20 hours, then heated to the temperature of 195°F. and maintained at that temperature for 4 hours. Then the benzene, water and acetic acid mixture was removed. The residue, after removal of salts, chromic acid, hexane, water and acetic acid, has 46.5 weight percent of coupled p-polybutylphenol of 6267 $\overline{M}_n$.

EXAMPLE 5

The general method of Example 1 is repeated except 0.355 mole (637 grams) of p-polybutylphenol of 1769 $\overline{M}_n$ dissolved in 763 grams SAE-5W oil and 0.6 liter of benzene is added slowly to ambient temperature, 2 liters of glacial acetic acid in which 118 grams (0.402 mole) potassium dichromate, 40 grams (0.212 mole) manganese acetate tetrahydrate and 0.1 liter water were dissolved. The resulting stirred mixture increased in temperature from ambient temperature (75°–77°F.) to 106°F. Stirring is continued for 20 hours and then a 0.6 liter mixture of benzene, water and acetic acid is distilled off. Thereafter removal of salts, chromic acid, hexane, water and acetic acid are conducted as described in Example 1. The residue obtained contains 46 weight percent of coupled p-polybutylphenol of 5347 $\overline{M}_n$.

EXAMPLE 6

The method of Example 5 is repeated using the same reactants and amounts thereof but addition of "the solution of p-polybutylphenol" was reduced to produce a temperature increase to 84°F. and stirring thereafter was continued for only 20 hours. The resulting reaction mixture is processed as described in Examples 1 and 5 to obtain a residue containing 47 weight percent coupled p-polybutylphenol of 3708 $\overline{M}_n$.

The coupled p-polybutylphenols in the residues produced by Examples 1 through 6, with respect to the original p-polybutylphenol used, contained the number of coupled units indicated in TABLE I below.

TABLE I

| Example Number | Coupled p-Polybutylphenol Product | |
|---|---|---|
| | $\overline{M}_n$ | Units of Original p-Polybutylphenol |
| 1 | 5000 | 3 |
| 2 | 3729 | 2 |
| 3 | 5031 | 3 |
| 4 | 6267 | 4 |
| 5 | 5347 | 3 |
| 6 | 3708 | 2 |

EXAMPLE 7

To a stirred solution made by dissolving 118 grams (0.402 mole) potassium dichromate, 40 grams (0.212) manganese tetrahydrate and 0.1 liter of water in 2 liters of glacial acetic acid in a reaction vessel containing a stirrer, heating mantel and reflux condenser there is added at ambient temperature (75°–77°F.) a solution of 0.355 mole (157.6 grams) p-n-$C_{25}$-alkyl-substituted phenol (alkyl group of 351 MW) of 444 MW dissolved in 0.6 liter of benzene at a rate to obtain a temperature increase to 106°F. Stirring of the resulting mixture is continued for 20 hours without increasing the temperature of the stirred mixture. Thereafter distillative removal of most of the benzene with some water and acetic acid; hexane addition to enhance separation of organic phase from chromic acid for its removal; and removal of salts, benzene, hexane, water and acetic acid are conducted as before described. The residue is coupled p-n-$C_{25}$-alkylphenol found to have a 2831 $\overline{M}_n$ which corresponds to a mixture of substantially equal molar proportions of 6 and 7 coupled units of p-n-$C_{25}$ alkyl-substituted phenol.

Examination of the coupled alkylphenol products of Examples 1 through 7 indicates nuclear carbon-to-carbon coupling of units of alkylphenol units.

The coupled alkylphenols produced by the method of this invention can be converted to mono- or di-sulfonyl chlorides by reaction in presence of hexane solvent of one mole of coupled alkylphenol with 2.4–2.8 moles of chlorosulfonic acid for the mono-sulfonyl chloride or 5–8 moles of chlorosulfonic acid for the disulfonyl chloride at ambient temperature and completing the reaction, about 2 hours, at the temperature at which a reflux of hexane is obtained. Such preparative method requires the removal of sulfuric acid sludge, conveniently accomplished by settling and withdrawing the organic phase, and hexane solvent. The mono- and di-sulfonyl chloride can be more conveniently obtained by reaction of one mole of coupled alkylphenol with one mole each of chlorosulfonic acid and sulfuryl chloride for the mono-sulfonyl chloride and two moles each of chlorosulfonic acid and sulfuryl chloride for the disulfonyl chloride of coupled alkylphenol. By such preparative method no sulfuric acid sludge is formed and the only by-products are HCl and $SO_2$ gases which are easily removed during refluxing and removing hexane solvent. Useful sulfonamide detergent-dispersant addition agents for lubricating oil can be made by reacting such sulfonyl chloride derivatives of coupled alkylphenols with a nitrogen-containing compound having at least one hydrogen on a nitrogen, preferably a nitrogen containing compound having two primary amino ($H_2N-$) groups (more fully defined below) but illustrated by ethylene diamine, 1,6-hexamethylene diamine, tetraethylene pentamine or bis-(aminopropyl) piperazine in the presence of an amount of pyridine to scavenage by-product HCl during reaction. Thereafter addition of calcium hydroxide to provide filterable calcium chloride and evaporation or distillation of hexane completes removal of HCl, pyridine and hexand solvent leaving the sulfonamide product as residue. Preferred as sulfonamide detergent-dispersant addition agents for crankcase lubricating oil are illustrated by the di(tetraethylene-pentamine) sulfonamide obtained by reaction of two moles of tetraethylene with one mole of disulfonyl chloride of coupled alkylphenol (one sulfonyl chloride group on each of the first and last alkylphenol unit); and the disulfonamide of bis(aminopropyl)piperazine obtained by reacting one mole of bis(aminopropyl)piperazine with two moles of monosulfonylchloride of coupled alkylphenol.

The coupled phenols of this invention can also be converted to Mannich Bases which are also detergent-dispersant addition agents for lubricating oils. Such Mannich Bases can be obtained by use of the coupled alkylphenol, a nitrogen-containing compound having at least one

HN—
| group and formaldehyde used in the Mannich Reaction (a condensation reaction) in the respective reactant molar ratio of 1.0:0.1–10.0:0.1–10.0. For such Mannich Reaction it is also preferred to use nitrogen-containing compounds having two primary amino ($H_2N-$) groups as in the alkylene diamines illustrated by ethylene diamine and 1,6-hexamethylene diamine; ethylene polyamines such as in those containing 2–10 ethylene groups and 3–11 amino groups illustrated by diethylene diamine and decaethylene undecamine; or in the bis(aminoalkyl)piperazine illustrated by bis(aminopropyl)piperazine and bis(aminopropyl)piperazine. The use of the foregoing reactant molar ratio for the Mannich Reaction is well known as is the Mannich Reaction. Illustrative preparations of such products of the Mannich Reaction are given in the following four examples.

EXAMPLE 8

The product of this Mannich Reaction is prepared from coupled (by present invention) p-polybutylphenol of 5031 $\overline{M}_n$, tetraethylenepentamine and formaldehyde used in the respective reactant molar ratio of 1.0:1.05:0.89. The coupled p-polybutylphenol is an equi-molar mixture of trimer and dimer of 1450 $\overline{M}_n$ p-polybutylphenol from the method of this invention (polybutyl-substituent of 1357 $\overline{M}_n$) and is used as a 46.5 weight percent solution of such coupled alkylphenol in light grade hydrocarbon oil solvent. The solution of coupled p-polybutylphenol and tetraethylenepentamine are added to a reaction vessel having a stirrer and heating mantle. Said mixture of solution and polyamine is stirred and heated to 300°F. and then diluted with an amount of SAE-5W oil to provide a 40 weight percent concentration of the final product. Formaldehyde as a 37 weight percent solution thereof (formalin) is added dropwise to the stirred hot oil diluted mixture of coupled alkylphenol and polyamine. At the end of formaldehyde addition the reaction mixture is blanketed with nitrogen atmosphere, heated again to a temperature of 300°F. and held at that temperature for 2 hours. Most of the water of reaction is driven off during said 2-hour period at 300°F. and the remainder of the water is removed by heating the reaction mixture to a temperature of 350°F. and maintaining such temperature for 30 minutes. The 350°F. reaction mixture is filtered through a celite filter cake to remove any insoluble polyamineformaldehyde resin formed as co-product. The filtrate is an oil solution containing about 40 weight percent of the Mannich Reaction product and, by analysis,, has a nitrogen content of 0.7 percent by weight.

EXAMPLE 9

The Mannich Reaction of Example 8 is repeated using present inventive coupled p-polybutylphenol of 4800 $\overline{M}_n$ (dimer and trimer of 1769 $\overline{M}_n$ p-polybutylphenol), as 45 weight percent solution thereof, tetraethylenepentamine, and formaldehyde in the respective molar ratio of reactants of 1.0:1.19:4.66. The resulting filtrate of oil (SAE-5W) diluted solution contains 40 weight percent of product of this Mannich Reaction is found by analysis to have a nitrogen content of 0.4 weight percent.

EXAMPLE 10

The Mannich Reaction of Example 9 is repeated using the same reactants but in the respective molar ratio of 1.0:2.4:6.0. The filtrate recovered is a solution, found by analysis, to have a nitrogen content of 0.7 weight percent, containing 40 weight percent of the Mannich Reaction product.

EXAMPLE 11

The Mannich Reaction of Example 8 is repeated using p-polybutylphenol of 1450 $\overline{M}_n$ (polybutyl group of 1357 $\overline{M}_n$) coupled by present invention to product of 6267 $\overline{M}_n$ (equal amounts of tetramer and pentamer). Said 6267 $\overline{M}_n$ coupled product, tetraethylenepentamine and formaldehyde are used in the respective molar ratio of reactants of 1.0:1.1.55:1.09. The resulting filtrate contains 40 weight of percent of this Mannich Reaction product and is found by analysis to contain 0.1 weight percent nitrogen.

EXAMPLE 12

The coupled p-n-$C_{25}$-alkyl-substituted phenol of Example 7 (substantially 1:1 hexamer and heptamer of n-$C_{25}$-alkyl-substituted phenol) having 2831 $\overline{M}_n$, tetraethylenepentamine and formaldehyde are used in the Mannich Reaction of Example 8. The respective molar ratio of reactants used in this reaction is 1.0:1.25:0.8. The filtrate contains 40 weight percent of the Mannich Reaction product and, by analysis, 1.14 weight percent nitrogen.

EXAMPLE 13

The p-polypropylphenol of 846 $\overline{M}_n$ (polypropyl group of 753) is coupled by the present invention to a dimeric product of 1690 $\overline{M}_n$ and 0.55 gram mole thereof as 43 weight percent solution thereof is reacted with 0.55 gram mole each of sulfurylchloride and chlorosulfonic acid in 200 ml. hexane to obtain 0.55 gram mole of the mono-sulfonyl chloride of said polypropylphenol dimer. The solution of sulfonyl chloride is reacted with 0.275 gram mole N,N'-bis-(aminopropyl)-piperazine in presence of 0.2 liter pyridine. To the reaction mixture there is added 0.275 gram hole calcium hydroxide, the mixture is diluted with 312 grams SAE-5W oil, filtered to remove calcium chloride and then hexane is distilled off which also removes the pyridine. There is obtained in this manner a 40 weight percent solution of bis-(dimeric p-polypropylphenolsulfonamide) of bis-(aminopropyl)piperazine which solution has a nitrogen content of 0.59 weight percent. This product, when used in a crankcase lubricating oil in a concentration of 5 volume percent used in an engine operating at high speed and heavy load equivalent to express highway speed towing house trailer, retards viscosity increase of the oil during 24 hours of engine operation by about 50% of the normal 24 hour increase in the absence of said sulfonamide. The corresponding sulfonamide of the original polypropylphenol (846 $\overline{M}_n$) in crankcase lubricating oil in the same concentration has no significant effect on retarding viscosity index increase after 24 hours use in the engine.

Sludge dispersancy function of the Mannich Reaction products from the coupled p-alkylphenols obtained by this invention can be illustrated by the following test procedure in which the source of sludge is that in drained, used crankcase oil containing large amounts of sludge, for example, crankcase oil drained from a Sequence VC Engine Test using a 289 cubic inch displacement engine with all emission control devices required for 1972 engine production or from filed testing of vehicles under stop and go urban driving conditions. In such sample of such used, drained oil containing 20 grams of sludge there is added the filtered solutions of Examples 8–11 to provide 0.5 grams of the Mannich Reaction product. The mixture is stirred, heated to a temperature of 300°F. and held at that temperature for 3 hours. Two other samples of the same size of said sludge containing drained oil are also used and so heated. To one sample no additive (Control) is added. To the other sample an oil solution of Mannich Reaction product (Comparative) of 1769 $\overline{M}_n$ polybutylphenol, tetraethylenepentamine and formaldehyde (reactant molar ratio of 1.0:1.2:1.7) is added to provide 0.5 gram thereof per 20 grams of sludge. The Control and Comparative oil compositions are also stirred, heated to 300°F. and held at 300°F. for 3 hours. Then five drops of each oil at 300°F. is placed in separate marked and identified areas of blotting paper and the blotting paper is held at ambient temperature (75°–77°F.) for 19 hours. Thereafter the area of the oil ring (Do) and area of the sludge ring (Ds) are measured and the ratio of Ds to Do is calculated. A ratio of Ds to Do of 1.0 or 100 for Ds:Do × 100, indicates exceptionally high sludge dispersancy. The test results from the six used oil samples are shown in the table below.

OIL SPOT SLUDGE DISPERSANCY TEST-USED OIL

| Additive | Ds/Do Ratio × 100 – 19 Hours |
|---|---|
| None-Control | 52 |
| Comparative | 67 |
| Example 8 | 92 |
| " 9 | 67 |
| " 10 | 67 |
| " 11 | 67 |

All the Mannich Reaction products at 0.5 gram per 20 grams of sludge dispersed the sludge and held the dispersed sludge in the foregoing tests. The product of Example 8 was very superior and products of Examples 9 and 11 equivalent to the Comparative product with respect to sludge dispersancy at equal weight of additive to sludge treatment. Based on additive molar basis, the products of Examples 9–11 were superior to the Comparative additive because those additives of substantially higher molecular weight were, at equal weight per 20 grams of sludge, actually present a much lower mole fraction than the Comparative product.

The product of Example 8 when added at 5 weight percent to SAE-5W grade oil provides viscosity index of 100 as determined from 110°F. viscosity of 101.2 SUS and 210°F. viscosity of 39.51 SUS.

What is claimed is:

1. A method of nuclearly carbon-to-carbon coupling two to seven molecules of a p-alkyl-substituted phenol, wherein the alkyl-substituent has a molecular weight in the range of 85 to 3,000, which method comprises slowly adding said alkylphenol to a mixture at ambient temperature which mixture comprises benzene and a glacial acetic acid solution of (a) manganese acetate in an amount to provide 0.3 to 0.6 gram atom manganese and (b) chromic acid in an amount to provide 1 to 3.5 moles both per mole of said alkylphenol at a rate of alkylphenol addition to provide a temperature increase of 5° to 30°F; after addition of said alkylphenol heating the resulting mixture to a temperature of at least 110°F but not exceeding 200°F; distilling benzene and water containing 1 to 3% acetic acid from the reaction mixture; and separating the coupled alkylphenol product from chromic acid, insoluble metal salts and acetic acid.

2. The method of claim 1 wherein the insoluble metal salts are removed by filtration, chromic acid is removed by phase separation assisted by the addition of $C_5$ to $C_{10}$ alkane hydrocarbon to the mixture of coupled alkylphenol and acetic acid, washing said alkane hydrocarboncontaining phase with water, and distilling acetic acid and said alkane from the water-washed phase.

3. The method of claim 2 wherein said reaction is conducted by adding a benzene diluted aliphatic hydrocarbon solution of the alkyl-substituted phenol to an ambient temperature acetic acid solution of chromic acid and manganese without removing heat of reaction and continuing contact between said alkylphenol and acetic acid solution for 20 hours without addition of heat thereto wherein the aliphatic hydrocarbon solvent is a light grade lubricating oil, hydrocarbon of molecular weight corresponding to said alkyl-substituent or a mixture thereof.

4. The method of claim 2 wherein said acetic acid solution is obtained by dissolving potassium dichromate and manganese acetate tetrahydrate in glacial acetic acid with an amount of water to complete dissolution of manganese acetate.

5. A coupled alkyl-substituted phenol having the formula:

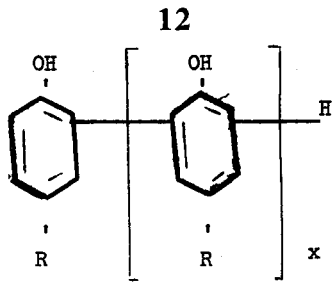

wherein $x$ is an integer from 1 to 6 and R is the alkyl-substituent of 85 to 3000 molecular weight.

6. The mixture of equal amounts of coupled alkylphenol of claim 5 wherein R is the n-$C_{25}$-alkyl radical and $x$ is 5 and 6.

7. The coupled alkylphenol of claim 5 wherein R is polybutyl radical of 1769 $\overline{M}_n$ and $x$ is 1 to 5.

8. The mixture of equal amounts of coupled alkylphenol of claim 5 wherein R is polybutyl radical of 1357 $\overline{M}_n$ and $x$ is 4 and 5.

9. The coupled alkylphenol of claim 5 wherein R is polypropyl radical of 753 $\overline{M}_n$ and $x$ is 2.

* * * * *

UNITED STATES PATENT OFFICE
CERTIFICATE OF CORRECTION

PATENT NO. : 3,876,709
DATED : April 8, 1975
INVENTOR(S) : Richard J. Lee and Robert E. Karll It is certified that error appears in the above-identified patent and that said Letters Patent are hereby corrected as shown below:

TITLE  Should be -- Nuclear Oxidative Coupling of Alkyl-Substituted Phenols in Presence of Lower Alkenoic Acid Solution of Potassium Dichromate and Manganese Acetate --

| Col. | Line | |
|---|---|---|
| 7 | 32 | "hexand" should be -- hexane -- |
| 7 | 65 | Should be -- bis(aminomethyl)piperazine and bis(aminopropyl)pip- -- |
| 8 | 10 | "1.0:1.05:0.89" should be -- 1.0:1.25:0.89 -- |
| 8 | 68 | "1.0:1.1.55:1.09" should be -- 1.0:1.55:1.09 -- |
| 9 | 1 | Omit "of" following "weight" |
| 9 | 27 | "hole" should be -- mole -- |
| 11 | 2 | "boncontaining" should be -- bon-containing -- |

Signed and sealed this 17th day of June 1975.

(SEAL)
Attest:

RUTH C. MASON
Attesting Officer

C. MARSHALL DANN
Commissioner of Patents
and Trademarks